United States Patent
Abdulkhair et al.

(10) Patent No.: US 12,486,164 B1
(45) Date of Patent: Dec. 2, 2025

(54) METHOD OF PRODUCING HYDROGEN GAS USING NANOCOMPOSITE CATALYST

(71) Applicant: IMAM MOHAMMAD IBN SAUD ISLAMIC UNIVERSITY, Riyadh (SA)

(72) Inventors: Babiker Yagoub Elhadi Abdulkhair, Riyadh (SA); Mohamed Khairy Omran, Riyadh (SA); Mohamed Nady Abd El-Hameed Ibrahim, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/210,266

(22) Filed: May 16, 2025

(51) Int. Cl.
| | |
|---|---|
| *C01B 3/06* | (2006.01) |
| *B01J 21/08* | (2006.01) |
| *B01J 35/45* | (2024.01) |
| *B01J 35/30* | (2024.01) |
| *B01J 35/51* | (2024.01) |
| *B01J 35/63* | (2024.01) |
| *B01J 35/64* | (2024.01) |

(52) U.S. Cl.
CPC ............ *C01B 3/065* (2013.01); *B01J 21/08* (2013.01); *B01J 35/45* (2024.01); *B01J 35/393* (2024.01); *B01J 35/51* (2024.01); *B01J 35/633* (2024.01); *B01J 35/647* (2024.01); *C01P 2002/72* (2013.01); *C01P 2002/90* (2013.01); *C01P 2004/04* (2013.01); *C01P 2004/32* (2013.01); *C01P 2004/64* (2013.01); *C01P 2004/82* (2013.01); *C01P 2006/14* (2013.01); *C01P 2006/16* (2013.01)

(58) Field of Classification Search
CPC ............ C01B 3/065; B01J 35/45; B01J 21/08
See application file for complete search history.

(56) References Cited

FOREIGN PATENT DOCUMENTS

CN 114433165 B 9/2024

OTHER PUBLICATIONS

Cafer Saka, "Efficient and durable H2 production from NaBH4 methanolysis using N doped hybrid g-C3N4—SiO2 composites with ammonia as a nitrogen source", Fuel, vol. 324, Part A, May 13, 2022, 124594, Excerpts only, 5 pages.
(Continued)

*Primary Examiner* — James A Fiorito
(74) *Attorney, Agent, or Firm* — Oblon, McClelland, Maier & Neustadt, L.L.P.

(57) ABSTRACT

A method of producing hydrogen gas comprising hydrolyzing sodium borohydride ($NaBH_4$) with water at a temperature of from about 20° C. to about 75° C. in the presence of a particulate crystalline nanocomposite catalyst, where the ratio by weight of $NaBH_4$ to the particulate crystalline nanocomposite catalyst is from about 1:1 to about 5:1. The particulate crystalline nanocomposite catalyst comprises a calcium hydrogen phosphate ($CaHPO_4$) crystalline phase, a calcium silicate hydroxide $[Ca_6Si_6O_{17}(OH)_2]$ crystalline phase, a silicon oxide ($SiO_2$) crystalline phase, graphitic carbon nitride ($C_3N_4$) crystalline phase, wherein at least a fraction of the graphitic-$C_3N_4$ is in the form of mesoporous nanosheets.

18 Claims, 7 Drawing Sheets

(56) References Cited

OTHER PUBLICATIONS

Khulaif Alshammari, et al., "Synthesis of Sulfur@g-C3N4 and CuS@g-C3N4 Catalysts for Hydrogen Production from Sodium Borohydride", Materials 2023, vol. 16 4218, Jun. 7, 2023, 15 pages.
Marwah M. Alsowayigh, et al., "Investigation of Calcium Phosphate Catalysts in Sodium Borohydride Methanolysis for Improved Hydrogen Production", Catalysts, vol. 14 Issue 8, Aug. 7, 2024, pp. 1-13, 14 pages.
Serdar Akbayrak, et al., "Inverse relation between the catalytic activity and catalyst concentration for the ruthenium(0) nanoparticles supported on xonotlite nanowire in hydrogen generation from the hydrolysis of sodium borohydride", Journal of Molecular Catalysis A: Chemical, vol. 424, Dec. 1, 2016, pp. 254-260, Excerpts only, 8 pages.

METHOD OF PRODUCING HYDROGEN GAS USING NANOCOMPOSITE CATALYST

BACKGROUND

Technical Field

The present disclosure is directed to a method of producing hydrogen gas. More particularly, the present disclosure is directed towards a calcium hydrogen phosphate ($CaHPO_4$), calcium silicate hydroxide [$Ca_6Si_6O_{17}(OH)_2$] and silicon dioxide ($SiO_2$) based nanocomposite dispersed on a matrix of graphitic carbon nitride (g-$C_3N_4$) nanosheets which has utility in producing hydrogen gas using sodium borohydride ($NaBH_4$).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The tremendous industrialization and population increase in recent years have led to a search for alternate energy sources to meet the expanding energy demand. Primarily, the depletion of non-renewable energy resources and environmental concerns are compelling societies to switch to clean, renewable energy sources. On account of its high energy density (120 megajoules per kilograms (MJ/kg)), non-toxicity, and ecological friendliness, hydrogen gas has emerged as an important energy carriers among renewable sources.

While solar energy generation is inexpensive, the storage of this energy incurs costs due to a reliance on batteries, which require frequent replacement and pose challenges in their safe disposal. Conversely, hydrogen energy provides numerous advantages over batteries in terms of energy conservation and powering diverse applications. A key benefit is that that hydrogen possesses a higher energy density than conventional batteries, allowing it to store greater energy in a less volume: this renders hydrogen optimal for applications such as transportation, where weight and space are paramount. Refueling a hydrogen vehicle requires only a few minutes, akin to conventional gasoline automobiles, whereas charging batteries can be far more time-consuming. Hydrogen fuel cells, for instance, offer extended ranges relative to battery electric vehicles, rendering fuel-cell powdered vehicles appropriate for heavy-duty applications and long-distance journeys. In larger-scale vehicular applications, such as trucks or ships, hydrogen fuel cells may be lighter than comparable battery systems, which is essential for efficiency and payload capacity. Moreover, in contrast to batteries, which deteriorate over time and necessitate replacement, hydrogen systems can sustain performance for an extended duration with adequate maintenance. Hydrogen production can be amplified from renewable sources, potentially resulting in sustainable and extensive energy storage options: the generation of hydrogen through electrolysis utilizing solar or wind energy is an important example. Hydrogen derived from renewable sources furthermore provides a clean energy alternative, generating solely water vapor when utilized in fuel cells.

Hydrogen is applicable in other areas outside transportation, including industrial operations, heating, and energy storage, hence offering variety in energy solutions. Hydrogen can retain surplus renewable energy for extended durations, assisting in the equilibrium of supply and demand within the energy system. Hydrogen can stabilize the electrical grid by serving as a versatile energy storage solution, absorbing surplus energy during peak production periods.

Despite its inherent advantages, the difficulties in safely storing and transporting hydrogen have stymied its widespread utilization.

Hydrogen is typically stored either: under compression; as a liquid under deep refrigeration; through being chemically bound within a metal hydride; or, through being chemically bound within other compounds. Sodium borohydride ($NaBH_4$) has become an important compound for hydrogen storage given its stability, non-flammability and non-toxicity: $NaBH_4$ further contains two moles of hydrogen ($H_2$) and that hydrogen constitutes 10.8 wt. % of the compound.

When required, hydrogen is released from $NaBH_4$ by hydrolysis:

According to this reaction, the hydrolysis releases the 2 moles of hydrogen bound within the $NaBH_4$, as well as hydrogen bound within the reactant water.

$NaBH_4$ may undergo self-hydrolysis but this occurs at a very slow reaction rate. Consequently, either heterogeneous or homogeneous catalysts are employed to drive the hydrolysis reaction at viable temperatures, such as temperatures close to room temperature. Heterogeneous catalysts are preferred in this context on the basis that they: typically possess longer functional lifetimes; can be facilely separated from the sodium metaborate ($NaBO_2$) solution formed as a co-product of the hydrolysis reaction; and, are not associated with the formation of gaseous side products, such as diborane.

Active heterogeneous catalysts for the hydrolysis process of sodium borohydride have predominantly been based on noble metals, such as Pt, Ru and Pd. [See: Huff C, Long J M, Heyman A, Abdel-Fattah T M (2018) *ACS Appl Energy Mater* 1:4635-4640; Brack P, Dann S E, Wijayantha K G U (2015) *Energy Sci Eng* 3:174-188; Wei L, Ma M, Wang D, Wang Q, Lu Y, Zhang S (2018) *Funct. Mater. Lett.* 11:1850079.] However such noble metals are associated with high costs, low abundance and toxicity [See Bullock R M (2017) *Chemistry* 2:444-446].

Accordingly, one objective of the present disclosure is to provide a composite material for hydrogen production via hydrolysis of sodium borohydride ($NaBH_4$). This method circumvents the aforementioned drawbacks and helps to achieve enhanced activity and efficiency in hydrogen generation.

SUMMARY

In an exemplary embodiment, a method of producing hydrogen gas is described. The method comprises hydrolyzing sodium borohydride ($NaBH_4$) with water at a temperature from about 20° C. to about 75° C. in the presence of a particulate crystalline nanocomposite catalyst, wherein the ratio by weight of $NaBH_4$ to the particulate crystalline nanocomposite catalyst is from about 1:1 to about 5:1. Further, the particulate crystalline nanocomposite catalyst comprises, as determined by X-Ray Diffraction: a calcium hydrogen phosphate ($CaHPO_4$) crystalline phase; a calcium silicate hydroxide [$Ca_6Si_6O_{17}(OH)_2$] crystalline phase; a silicon oxide ($SiO_2$) crystalline phase; and, a graphitic carbon nitride (g-$C_3N_4$) crystalline phase, where at least a fraction of the graphitic-$C_3N_4$ is in the form of mesoporous nanosheets.

In some embodiments, the particulate crystalline nanocomposite comprises: $CaHPO_4$ which is present in a total amount of from about 20 (weight percent) wt. % to about 40 wt. %; $Ca_6Si_6O_{17}(OH)_2$ in an amount of about 20 wt. % to about 30 wt. %; $SiO_2$ in an amount of from about 1 wt. % to about 10 wt. %; and, g-$C_3N_4$ in an amount of about 20 wt. % to about 30 wt. %.

In some embodiments, the particulate crystalline nanocomposite comprises acicular particles of $Ca_6Si_6O_{17}(OH)_2$ having a median length of from about 20 nanometers (nm) to about 80 nm, as determined by Transmission Electron Microscopy (TEM).

In some embodiments, the particulate crystalline nanocomposite comprises aggregates of the mesoporous nanosheets of graphitic-$C_3N_4$ with substantially spherical particles of $SiO_2$ and $CaHPO_4$.

In some embodiments, the particulate crystalline nanocomposite includes aggregates of the mesoporous nanosheets of graphitic-$C_3N_4$, and substantially spherical particles of $SiO_2$ and $CaHPO_4$ having a median particle size of from about 5 nm to about 30 nm, as determined by TEM.

In some embodiments, at least about 50 wt. % of the graphitic-$C_3N_4$ is in the form of mesoporous nanosheets.

In some embodiments, at least about 80 wt. % of the graphitic-$C_3N_4$ is in the form of mesoporous nanosheets.

In some embodiments, the particulate crystalline nanocomposite has an average pore diameter of from about 10 nm to about 25 nm, as determined by Barrett-Joyner-Halenda (BJH) desorption analysis.

In some embodiments, the particulate crystalline nanocomposite has an average pore diameter of from about 15 nm to about 25 nm, as determined by BJH desorption analysis.

In some embodiments, the particulate crystalline nanocomposite has a pore volume of from about 0.1 cubic centimeter ($cm^3/g$) to about 0.4 $cm^3/g$, as determined by BJH desorption analysis.

In some embodiments, the particulate crystalline nanocomposite has a pore volume of from about 0.2 $cm^3/g$ to about 0.3 $cm^3/g$, as determined by BJH desorption analysis.

In some embodiments, the particulate crystalline nanocomposite has a hysteresis loop of Type H3 (IUPAC Classification), as determined by $N_2$ adsorption-desorption analysis at 77 Kelvin (K).

In another exemplary embodiment, there is provided a method of preparing the particulate crystalline nanocomposite, the method comprising: forming a solution of a calcium salt and an alkali metal silicate in a solvent including water and a $C_1$-$C_4$ alkanol; and, heating the solution at a temperature of from about 150° C. to about 250° C. to form a dry product of $CaSiO_3$. Still further, the method includes forming graphitic-$C_3N_4$ by heating urea in a closed vessel at a temperature of from about 500° C. to about 700° C. Furthermore, the method comprises: dispersing the $CaSiO_3$, graphitic-$C_3N_4$ and diphosphorus pentoxide ($P_2O_5$) in a polar protic solvent and heating the dispersion at a temperature of from about 150° C. to about 250° C. at a pressure of from about 2 bar to about 8 bar; and, separating the solid crystalline nanocomposite from the heated dispersion.

In some embodiments, the ratio by weight of sodium borohydride to the particulate crystalline nanocomposite catalyst is from about 1:1 to about 3:1.

In some embodiments, sodium borohydride is hydrolyzed with water at a temperature of from about 25° C. to about 70° C.

In some embodiments, sodium borohydride is hydrolyzed with water at a temperature of from about 35° C. to about 60° C.

In some embodiments, the method has a hydrogen generation rate of from about 100 milliliter per minute per gram (mL $min^{-1}$ $g^{-1}$) to about 1500 mL $min^{-1}$ $g^{-1}$ based on the weight of the $NaBH_4$.

In some embodiments, the method has a hydrogen generation rate of from about 200 mL $min^{-1}$ $g^{-1}$ to about 1500 mL $min^{-1}$ $g^{-1}$ based on the weight of the $NaBH_4$.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof may be readily obtained as the same becomes better understood by reference to the following detailed description when considered in connection with the accompanying drawings, wherein.

DETAILED DESCRIPTION

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term "room temperature" refers to a temperature range of 23 degrees Celsius (° C.)±2° C. in the present disclosure. As used herein, "ambient conditions" means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term "fraction" refers to a numerical quantity which defines a part up to, but not including, 100 percent or the entirety of the thing in question.

As used herein the term "disposed" refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term "Scanning Electron Microscopy" or "SEM" refers to a surface-imaging technique that produces images of a sample by scanning the sample with a focused beam of electrons. Unless otherwise specified, the SEM shall include all imaging techniques using electron beams for imaging.

As used herein, the term "high-resolution transmission electron microscopy (HRTEM)" refers to a powerful imaging technique used to observe the fine details of materials at the atomic scale. In HRTEM, a high-energy electron beam is transmitted through a thin sample, and the transmitted electrons are used to form detailed images with extremely high resolution.

As used herein, the term "X-ray diffraction" or "XRD" or "X-ray crystallography" refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein with respect to X-ray diffraction analysis, "JCPDS" denotes the Joint Committee on Powder Diffraction Standards.

The term "unit cell" as used herein refers to the smallest and simplest volume element (i.e., parallelpiped-shaped block) of a crystal that is completely representative of the unit or pattern of the crystal, such that the entire crystal can be generated by translation of the unit cell. The dimensions of the unit cell are defined by six numbers: dimensions a, b and c; and, angles $\alpha$, $\beta$ and $\gamma$ (Blundel et al., 1976, *Protein Crystallography*, Academic Press, the disclosure of which is incorporated herein by reference in its entirety). A crystal is an efficiently packed array of many unit cells.

The term "triclinic crystalline phase" refers to a crystal structure in which the unit cell is characterized by three mutually perpendicular aces of unequal length ($a \neq b \neq c$) wherein further $\alpha \neq \beta \neq \gamma$.

An orthorhombic crystalline phase refers to a crystal structure having three mutually perpendicular axes of unequal lengths ($a \neq b \neq c$) but wherein the crystal lattice forms a rectangular prism where the edges represent the three axes, all intersecting at 90-degree angles ($\alpha = \beta = \gamma =$) 90°.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non −90° angle.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "particle" refers to a small object that acts as a whole unit with regard to its transport and properties. As used herein, "nanoparticles"—sometimes contracted herein to NPs—refers to particles having a particle size of 1 nanometer (nm) to 1000 nm.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Similarly, if used, the term "Dv90" refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term "nanocomposite" refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

As used herein, the term "porosity" refers to a measure of the void or vacant spaces within a material. As used herein, the term "pore volume" refers to the total volume of void spaces (pores) within a material that is capable of being filled by a gas or liquid: it is typically expressed in cubic centimeters per gram ($cm^3/g$). As used herein, the term "pore diameter" refers to the median width or size of the pores (void spaces) within a material, typically measured in nm or angstroms (Å).

Pores may be micropores, mesopores, macropores, and/or a combination thereof. The pores exist in the bulk material, not necessarily in the molecular structure of the material. The term 'microporous' means that particulate crystalline nanocomposite have pores with an average pore width (i.e., diameter) of less than 2 nm. The term 'mesoporous' means the pores of the nanocomposite have an average pore width of 2-50 nm. The term 'macroporous' means the pores of the nanocomposite have an average pore width larger than 50 nm. Pore size may be determined by methods including, but not limited to, gas adsorption (e.g., $N_2$ adsorption), mercury intrusion porosimetry, and imaging techniques such as SEM and X-ray computed tomography (XRCT).

Having regard to a parameter distribution of the disclosed material, the term "monomodal" references only one peak being observed in a frequency distribution graph of said parameter. The term "polymodal" references a distribution with two or more distinct peaks or modes. The terms bimodal and trimodal may be utilized herein to reference the presence of two or three modes, respectively.

As used herein, the Brunauer-Emmett-Teller (BET) analysis references the method of measuring the specific surface area ($m^2/g$) of a solid material via the adsorption of gas molecules onto the surface of the solid, as detailed in standard NF ISO 5794-1, Appendix E (June 2010).

As used herein, the Barrett, Joyner, and Halenda (BJH) desorption analysis refers to the method of determining the volume of mesopores per unit mass (mL/g) of a solid material utilizing the adsorption and desorption isotherms associated with gas molecules inside the mesopores of the solid, as detailed in Technical Standard DIN 66134:1998-02.

As used herein, the term "porous particulate nanocomposite" refers to a material composed of discrete particles that form a structure with interconnected pores or voids. These pores allow for the passage of fluids or gases, contributing to the material's overall porosity. The composite typically consists of two or more distinct phases, which may include various inorganic or organic components, and is characterized by its unique morphology, such as irregularly shaped particles or aggregates.

The term "graphitic carbon nitride" often abbreviated to g-$C_3N_4$, refers to a family of carbon nitride compounds with a layered structure similar to graphene. Graphitic carbon nitride may be considered a synthetic polymer primarily composed of carbon and nitrogen, with some hydrogen impurities.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

The term "polar solvent" as used herein refers to a solvent having a dielectric constant ($\varepsilon$) of more than 5 as measured at 25° C. The determination of dielectric constant ($\varepsilon$) is known in the art: the use of measured voltages across parallel plate capacitors in such determinations may be mentioned. The term "polar solvent" may encompass both aprotic and protic solvents, wherein protic solvents are those solvents which are capable of yielding or accepting a proton and aprotic solvents are those solvents that do not yield or accept a proton.

Water, for use as a (co-)solvent or diluent herein, is intended to mean water of low solids content as would be understood by a person of ordinary skill in the art. The water may, for instance, be distilled water, demineralized water, deionized water, reverse osmosis water, boiler condensate water, or ultra-filtration water. Tap water may be tolerated in certain circumstances.

As used herein, 'comminuting' refers to process of reducing the average size of solid materials into smaller particles, by crushing, grinding, cutting, vibrating, or other processes.

The term "hydrolysis", as used herein, is the chemical reaction of a molecule with water to produce two or more smaller molecules.

As used herein, 'hydrogen generation rate' (HGR) refers to the amount of hydrogen gas produced per unit of time during a chemical reaction.

The term "sonication" refers to a process that uses sound energy (sonic waves) to agitate particles in a sample. As used herein, the term "ultrasonication" refers to irradiation with ultrasonic waves having a frequency of at least 20 kHz. Without intention to limit the present disclosure, (ultra)sonication may be performed using an (ultra)sonic bath or an (ultra)sonic probe.

As used herein, the term "calcination" refers to a thermal treatment process which is conducted in the absence of, or under a restricted supply of ambient oxygen. This is performed to remove impurities or volatile substances and/or to induce thermal decomposition or a change in the thermally treated material.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

As used herein, "$C_1$-$C_n$ alkyl" group refers to a monovalent group that contains from 1 to n carbons atoms, that is a radical of an alkane and includes straight-chain and branched organic groups. As such, a "$C_1$-$C_4$ alkyl" group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labelled compounds of the disclosure may generally be prepared by conventional techniques known to those skilled in the art or by processes analogous to those described herein, using an appropriate isotopically-labelled reagent in place of the non-labelled reagent otherwise employed.

The present disclosure is intended to include all hydration states of a given compound or formula, unless otherwise noted or when heating a material.

Aspects of this disclosure are directed to a method of producing hydrogen gas using a $CaHPO_4/Ca_6Si_6O_{17}(OH)_2/SiO_2/g$-$C_3N_4$ particulate crystalline nanocomposite, which functions as a catalyst for the hydrolysis of sodium borohydride ($NaBH_4$). The catalyst facilitates the safe and rapid release of hydrogen from $NaBH_4$, making it an efficient solution for clean hydrogen production. The present disclosure circumvents the drawbacks of prior art by addressing key limitations such as high catalyst costs, slow reaction rates, and environmental concerns. Traditional catalysts often require expensive materials, resulting in inefficient or slow hydrogen production. In contrast, the present disclosure uses a cost-effective catalyst that promotes faster hydrogen generation without relying on toxic or scarce materials. The preparation simplicity and high catalytic activity also ensure scalability and practical applicability, making it a more efficient and sustainable alternative to existing methods.

According to a first aspect of the present disclosure, a particulate crystalline nanocomposite is described. The particulate crystalline nanocomposite comprises: a $CaHPO_4$ crystalline phase; a $Ca_6Si_6O_{17}(OH)_2$ crystalline phase; a $SiO_2$ crystalline phase; and, a g-$C_3N_4$ crystalline phase.

In some embodiments, $CaHPO_4$ may exist in an amorphous form or in various crystalline forms, such as monoclinic, tetragonal, and amorphous. The crystalline structure of $CaHPO_4$ is typically monoclinic. In this structure, the phosphate groups ($PO_4^{2-}$) are tetrahedrally disposed; calcium ions ($Ca^{2+}$) are coordinated by oxygen atoms from the phosphate and hydroxide groups; and, hydrogen phosphate ($HPO_4^{2-}$) anions are oriented in a way that maximizes electrostatic interactions with calcium ions. This arrangement creates a stable crystalline lattice with ions organized for optimal bonding and structural stability.

In some embodiments, in the particulate crystalline nanocomposite consists essentially of sheet morphologies, preferably nanosheets. This does not preclude the presence of other morphologies, such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nano-urchins, nanoflowers, nanostars and tetrapods.

In some embodiments, the particulate crystalline nanocomposite has a two-dimensional porous structure constructed with curled and wrinkled nanosheets and platelets of the g-$C_3N_4$. In another preferred embodiment, at least a fraction of the graphitic-$C_3N_4$ is in the form of mesoporous nanosheets. For instance, at least about 40 wt. %, about 45 wt. %, about 50 wt. %, about 60 wt. %, about 65 wt. % or about 75 wt. % of the graphitic-$C_3N_4$ is in the form of mesoporous nanosheets. In a preferred embodiment, at least about 50 wt. % of the graphitic-$C_3N_4$ is in the form of mesoporous nanosheets. In another preferred embodiment, at least about 80 wt. % of the graphitic-$C_3N_4$ is in the form of mesoporous nanosheets.

In some embodiments, based on the weight of the particulate crystalline nanocomposite: $CaHPO_4$ is present in the total amount of from about 20 to about 40 wt. %, for example about 21-39 wt. %, about 22-37 wt. %, about 23-35 wt. %, about 24-33 wt. %, about 25-31 wt. %, or about 26-29 wt. %; $Ca_6Si_6O_{17}(OH)_2$ is present in an amount of about 20 to about 30 wt. %, for example about 21-29 wt. %, about 22-28 wt. %, about 23-27 wt. %, or about 24-26 wt. %; $SiO_2$ is present in an amount of from about 1 to about 10 wt. %, for example about 1.5-9.5 wt. %, about 2-9 wt. %, about 2.5-8.5 wt. %, about 3-8 wt. %, about 3.5-7.5 wt. %, about 4-7 wt. %, about 4.5-6.5 wt. % or about 5-6 wt. %; and, $C_3N_4$ is present in an amount of about 20 to about 30 wt. %, for example about 21-29 wt. %, about 21.5-28.5 wt. %, about 22-28 wt. %, about 22.5-27.5 wt. %, about 23-27 wt. %, about 23.5-26.5 wt. %, about 24-26 wt. % or about 25-25.5 wt.

In some embodiments, the particulate crystalline nanocomposite includes acicular particles of $Ca_6Si_6O_{17}(OH)_2$ having a median length of from about 20 to about 80 nm, for example about 21-79 nm, about 23-77 nm, about 25-75 nm, about 27-73 nm, about 29-71 nm, about 31-69 nm, about 33-67 nm, about 35-65 nm, about 37-60 nm, about 39-55 or about 40-50 nm, as determined by Transmission Electron Microscopy (TEM).

In some embodiments, the particulate crystalline nanocomposite is porous. A porous material forms a porous bulk solid.

In some embodiments, the particulate crystalline nanocomposite may be mesoporous, microporous, and macroporous. In some embodiments, the particulate crystalline nanocomposite includes aggregates of the mesoporous nanosheets of graphitic-$C_3N_4$ and substantially spherical particles of $SiO_2$ and $CaHPO_4$, said substantially spherical particles having a median particle size of from about 5 to about 30 nm, for example about 6-29 nm, about 6.5-28 nm, about 7-27 nm, about 7.5-26 nm, about 8-25 nm, about 8.5-24 nm, about 9-22 nm, about 9.5-20 nm or about 10-15 nm, as determined by TEM. In a preferred embodiment, the substantially spherical particles present on the surface of g-$C_3N_4$ have a mean particle size of 10.3 nm.

In certain embodiments, the graphitic carbon nitride (g-$C_3N_4$) may be present in at least one of the following morphologies: nanorectangles; nanotriangles; nanopentagons; nanohexagons; nanoribbons; nanodiscs; nanoflakes; nanofoils; and, nanobelts. In a preferred embodiment, the particulate crystalline nanocomposite includes aggregates of the mesoporous nanosheets of g-$C_3N_4$ with substantially spherical particles of $SiO_2$ and $CaHPO_4$.

In some embodiments, the particulate crystalline nanocomposite has an average pore diameter of from about 10 to about 25 nm, for example about 11-24 nm, about 12-23 nm, about 13-22 nm, about 14-21 nm, about 15-20 nm, about 16-19.5 nm or about 17-19 nm, as determined by Barrett-Joyner-Halenda (BJH) desorption analysis. In certain embodiments, the particulate crystalline nanocomposite has an average pore diameter of from about 15 to about 25 nm, for example about 15.5-24.5 nm, about 16-24 nm, about 16.5-23.5 nm, about 17-23 nm, about 17.5-22.5 nm, about 18-22 nm or about 18.5-21 nm, as determined by Barrett-Joyner-Halenda (BJH) desorption analysis. In a preferred embodiment, the average pore diameter of the composite is 18.92 nm.

In some embodiments, the particulate crystalline nanocomposite has a pore volume as determined by BJH desorption analysis of from about 0.1 to about 0.4 $cm^3/g$, for example about 0.15-0.39 $cm^3/g$, about 0.17-0.36 $cm^3/g$, about 0.19-0.34 $cm^3/g$, about 0.2-0.31 $cm^3/g$, about 0.21-0.29 $cm^3/g$, about 0.23-0.28 $cm^3/g$, about 0.25-0.27 $cm^3/g$. In certain embodiments, the particulate crystalline nanocomposite has a pore volume of from about 0.2 to about 0.3 $cm^3/g$, for example about 0.21-0.29 $cm^3/g$, about 0.22-0.28 $cm^3/g$ or about 0.23-0.27 $cm^3/g$, as determined by BJH desorption analysis. In a preferred embodiment, the pore volume of the nanocomposite is 0.256 $cm^3/g$.

In some embodiments, the particulate crystalline nanocomposite may exhibit a hysteresis loop of Type H3 (IUPAC Classification), as determined by nitrogen ($N_2$) adsorption-desorption analysis at 77 Kelvin (K). This indicates the formation of mesoporous structures. More particularly, the Type H3 loop may be associated with wedge-shaped pores formed by the loose stacking of flaky particles. The characteristic shoulder in the H3 loop is associated with the destabilization of condensate at the limiting P/P0 value, wherein P/P0 is the ratio of the absolute pressure (P) to the saturation vapor pressure (P0) at a given temperature.

Figure 1:
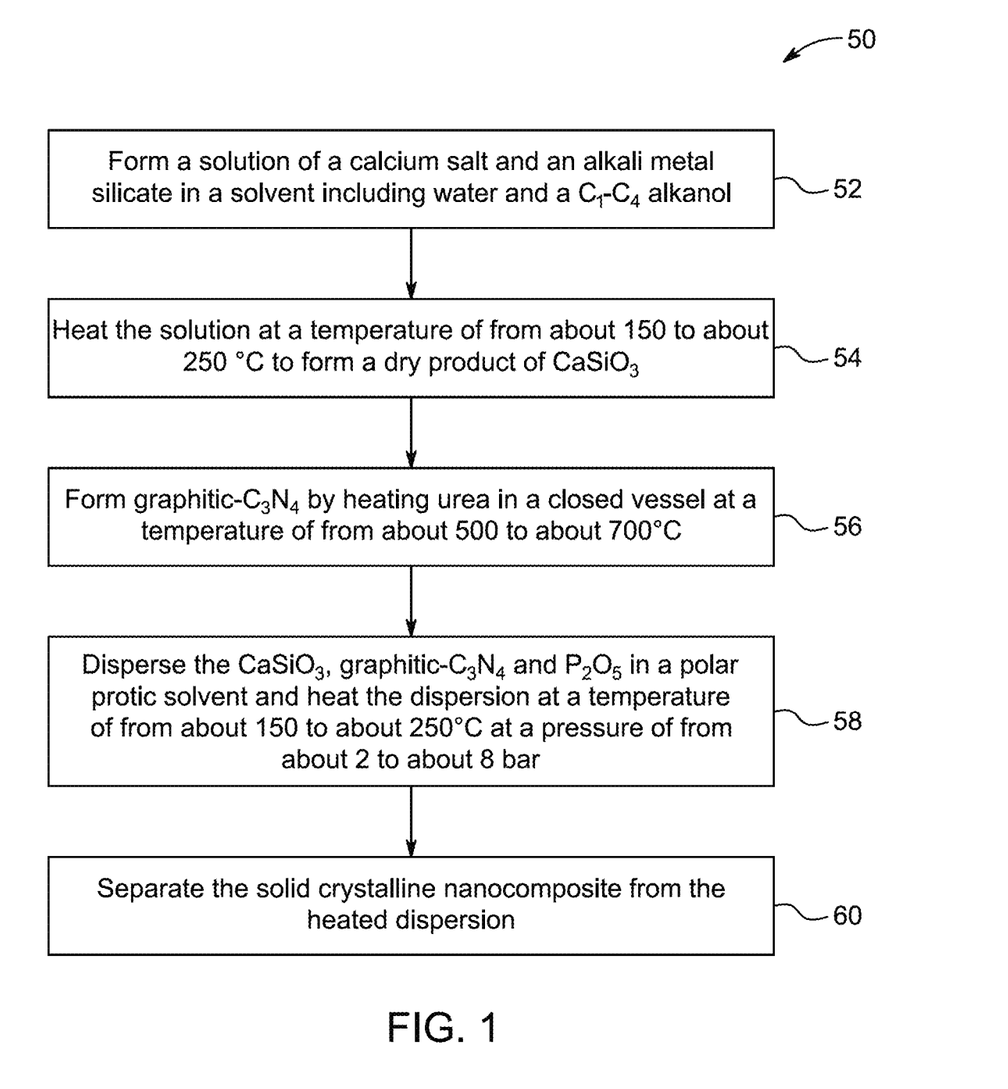
FIG. 1 is a schematic flowchart of a method of preparing a particulate calcium hydrogen phosphate/calcium silicate hydroxide/silicon dioxide/graphitic carbon nitride ($CaHPO_4$/$Ca_6Si_6O_{17}(OH)_2$/$SiO_2$/g-$C_3N_4$) crystalline nanocomposite, according to certain embodiments.

According to a second aspect of the present disclosure, a method of making the $CaHPO_4/Ca_6Si_6O_{17}(OH)_2$/g-$C_3N_4$ nanocomposite material is described and is illustrated in FIG. 1. The order in which the method 50 is described is not intended to be construed as a limitation, and any number of the described method steps may be combined to implement the method 50. Additionally, individual steps may be removed or skipped from the method 50 without departing from the spirit and scope of the present disclosure.

At step 52, the method 50 includes forming a solution of a calcium salt and an alkali metal silicate in a solvent including water and a $C_1$-$C_4$ alkanol. Exemplary calcium salts, which may be present alone or in combination include, but are not limited to calcium chloride, calcium sulfate, calcium carbonate, calcium phosphate, calcium acetate, calcium citrate, calcium lactate, calcium gluconate, calcium formate, calcium oxalate, calcium tartrate, calcium ascorbate, calcium benzoate, calcium propionate, calcium stearate, calcium hydroxide, calcium peroxide, calcium iodate, calcium molybdate, calcium hypochlorite, calcium thiocyanate, calcium chromate, calcium ferrite, calcium bromide, calcium fluoride, calcium sulfide, calcium arsenate, calcium tungstate, calcium borate, calcium perchlorate, and calcium hydride. In a preferred embodiment, calcium salt is calcium nitrate.

In some embodiments, alkali metal silicate may include but is not limited to potassium silicate, lithium silicate, rubidium silicate, cesium silicate, sodium orthosilicate, potassium orthosilicate, lithium orthosilicate, rubidium orthosilicate, cesium orthosilicate, sodium disilicate, potassium disilicate, lithium disilicate, rubidium disilicate, cesium disilicate, sodium trisilicate, potassium trisilicate, lithium trisilicate, rubidium trisilicate, cesium trisilicate, sodium tetrasilicate, potassium tetrasilicate, lithium tetrasilicate, rubidium tetrasilicate, cesium tetrasilicate, sodium hexasilicate, potassium hexasilicate, lithium hexasilicate, rubidium hexasilicate, and cesium hexasilicate. In a preferred embodiment, alkali metal silicate comprises or consists of sodium metasilicate.

In some embodiments, the molar ratio of the calcium salt to the alkali metal silicate may is from about 1:5 to 5:1, about 1:4 to 4:1, about 3:1 to 1:3, about 1:2 to 2:1, or about 1:1.

In some embodiments, C1-C4 alkanol may include but is not limited to methanol, propanol, isopropanol, butanol, isobutanol, sec-butanol, tert-butanol, 1-propanol, 2-propanol, 1-butanol, 2-butanol, methylpropanol, dimethylpropanol, ethylpropanol, cyclopropanol, fluoromethanol, chloromethanol, bromomethanol, and iodomethanol. In a preferred embodiment, alkanol is ethanol. The volume-by-volume (v/v) ratio of water to C1-C4 alkanol is in the range of about 1:5 to 5:1, for example about 1:4 to 4:1, about 1:3 to 3:1, about 1:2 to 2:1, or about 1:1. In a preferred embodiment, the volume-by-volume (v/v) ratio of water to ethanol is about 1:1.

At step 54, the method 50 includes heating the solution to form a dry product of $CaSiO_3$ at a temperature of from about 150 to about 250° C., for example from about 155 to about 245° C., from about 160 to about 240° C., from about 165 to about 235° C., from about 170 to about 230° C. or about 175 to about 225° C. This step involves the chemical reaction and dehydration processes that are necessary for converting the precursor materials into the desired solid product. The solution is preferably heated in an autoclave, but optionally, other known heating appliances may be used. In some embodiments, the solution is heated for a duration of from about 1 to about 5 hours, from about 1.5 to about 5 hours, from about 2 to about 5 hours, from about 2.5 to about 5 hours, from about 3 to about 5 hours, from about 3.5 to about 5 hours, from about 4 to about 5 hours, from about 4.5 to about 5 hours, or from about 2 to about 4 hours. In a preferred embodiment, the solution is heated for about 2 hours.

At step 56, the method 50 includes forming g-$C_3N_4$ by heating urea in a closed vessel at a temperature of about 500 to 700° C., for example from about 520 to about 680° C., from about 540 to about 660° C., from about 560 to about 640° C., or from about 580 to about 620° C. The heating may, for instance, be performed for a period of from about 30 to about 60 minutes, for example from about 40 to about 50 minutes, or about 45 minutes. Heating is performed in a closed vessel at step 56 to maintain a controlled atmosphere, preventing the escape of volatile components and ensuring the formation of graphitic-$C_3N_4$ under the required conditions of pressure and temperature. In an illustrative embodiment, the urea is heated to a temperature of about 600° C. for a period of about 45 minutes.

At step 58, the method includes dispersing the $CaSiO_3$, graphitic-$C_3N_4$ and $P_2O_5$ in a polar protic solvent and heating the dispersion: at a temperature of from about 150° C. to about 250° C., for example from about 160° C. to about 220° C., or from about 110° C. to about 240° C.; at a pressure of from about 2 to about 8 Bar, for example from about 1 to about 4 bar, from about 1.5 to about 2.5 bar, or from about 2 to about 3.5 bar. In a preferred embodiment, heating the dispersion takes place at a temperature of from about 150 to about 250° C. at a pressure of from about 2 to about 8 Bar.

Exemplary polar protic solvents include, but are not limited to, methanol, isopropanol, n-propanol, butanol, isobutanol, tert-butanol, pentanol, hexanol, cyclohexanol, ethylene glycol, propylene glycol, glycerol, formamide, mono($C_1$-$C_4$)alkyl ethers of ethylene glycol, mono($C_1$-$C_4$) alkyl ethers of propylene glycol dimethylformamide (DMF), acetic acid, propionic acid, lactic acid, formic acid, citric acid, phosphoric acid, trifluoroacetic acid, water, ammonia, methylamine, ethylamine, isopropylamine, n-propylamine, butylamine, sec-butylamine, tert-butylamine, diethylamine, dipropylamine, dimethylamine, triethylamine, triethanolamine, n-methylformamide (NMF), n-methylacetamide (NMA), hydrazine, hydroxylamine, and urea. In an exemplary embodiment, the polar protic solvent is a $C_1$-$C_4$ alkanol. In a preferred embodiment, the polar protic solvent is selected from the group consisting of mono($C_1$-$C_4$)alkyl ethers of ethylene glycol. An exemplary polar protic solvent is ethylene glycol monomethyl ether.

At step 60, the method 50 includes separating the solid particulate crystalline nanocomposite from the heated dispersion. As the solvent content decreases, the remaining components concentrate and solidify into a fine powder. This technique may utilize heating or vacuum conditions to accelerate the evaporation process, leaving behind a dry powder. In some embodiments, solid particulate crystalline nanocomposite may be separated from the heated dispersion using techniques such as: filtration, for instance gravity filtration, vacuum filtration, pressure filtration, or membrane filtration; centrifugation; decantation; gas flotation; capacitance-based separation; or microfiltration. Alternative separation methods which may have utility herein include natural and forced sedimentation and chromatography. In a preferred embodiment, filtration is performed via a Buchner system.

It is not precluded that the separated particulate crystalline nanocomposite is subjected to further processing. Such further processing may be performed in a single stage or multistage manner and may include one or more of: washing with water; drying; and, comminuting the nanocomposite in order to moderate particle morphology or the particle size distribution thereof. Exemplary drying conditions include a temperature of from about 50 to about 200° C., such as from about 100 to about 200° C. or from about 120 to about 180° C. Such drying may be carried out using known heating methods, such as a vacuum oven, rotary evaporator, microwave-assisted drying process, freeze-drying, and infrared drying. A method of hydrogen generation using the aforedescribed particulate crystalline nanocomposite catalyst is described. The method includes hydrolyzing $NaBH_4$ with water in the presence of the particulate crystalline nanocomposite catalyst at a temperature of from about 20 to 75° C., for example from about 22 to 73° C., about 24 to 71° C., or about 26 to 69° C. In some embodiments, $NaBH_4$ is hydrolyzed with water at a temperature of about 25 to about 70° C., for example about 26 to about 69° C., about 27 to about 68° C., or about 28 to about 67° C. In a preferred embodiment, $NaBH_4$ is hydrolyzed with water at a temperature of from about 25 to about 70° C. In yet another preferred embodiment, $NaBH_4$ is hydrolyzed with water at a temperature of from about 35 to about 60° C.

In some embodiments, the ratio by weight of sodium borohydride to the nanocomposite catalyst in the hydrolysis reaction is from about 1:1 to about 3:1, for example from about 1.5:1 to about 2.5:1 or from about 2:1 to about 2:1.

In embodiments of the hydrolysis method, the $NaBH_4$, in solid form, is mixed with the nanocomposite in solid form to provide a solid composition that is stable and storable at room temperature: there may be no decomposition to form hydrogen when the solid mixture of the $NaBH_4$ and the nanocomposite is stored under anhydrous conditions. The stable composition is later used as a source of hydrogen via the addition of water thereto. In alternate embodiments, the $NaBH_4$, in solid form and the nano composite are mixed immediately prior to contact with water.

It is preferred in the hydrolysis reaction that the median volume particle size (Dv50) of the nanocomposite catalyst is substantially less than the median volume particle size (Dv50) of the $NaBH_4$. The $NaBH_4$ may, for example, have a median volume particle size (Dv50) that is at least 5 or even at least 10 times the median volume particle size of the nanocomposite. Differences in the particle size between the two solids provide a means by which the rate of formation of hydrogen gas is buffered. For example, the rate of hydrogen gas formation achieved by adding liquid water to a mixture of particles of $NaBH_4$ and particles of the nanocomposite having essentially the same particle size may be from 2 to 6 times the rate of hydrogen formation provided by adding water to a mixture of particles of the $NaBH_4$ and the nano composite in which the $NaBH_4$ particles have an average particle size that is at least five times, preferably at least 10 times the particle size of the nanocomposite.

The hydrogen gas evolved as a hydrolysis product should be captured. This is often accomplished via gas collection equipment, such as inverted jars or specialized balloons, which allow the gas to gather securely. As the hydrogen forms, it is directed into these containers to keep it from escaping. Safety precautions are crucial since hydrogen is highly flammable. Once captured, hydrogen may be refined and stored for use in a variety of applications, including fuel cells and energy generation, making it an important resource for sustainable energy solutions.

In some embodiments, based on the weight of the $NaBH_4$, the method results in a hydrogen generation rate of about 100 to 1000 milliliters per minute per gram (mL $min^{-1}$ $g^{-1}$), for example about 110 to about 990 mL $min^{-1}$ $g^{-1}$, about 120 to about 980 mL $min^{-1}$ $g^{-1}$, about 130 to about 970 mL $min^{-1}$ $g^{-1}$, about 140 to about 960, about 150 to about 950 mL $min^{-1}$ $g^{-1}$, about 160 to about 940 mL $min^{-1}$ $g^{-1}$, about 170 to about 930 mL $min^{-1}$ $g^{-1}$, or about 180 to about 920 mL $min^{-1}$ $g^{-1}$. In a preferred embodiment, hydrogen generation rate is about 100 to about 1500 mL $min^{-1}$ $g^{-1}$ based on the weight of the sodium borohydride ($NaBH_4$). In yet another preferred embodiment, hydrogen generation rate is about 200 to about 1500 mL $min^{-1}$ $g^{-1}$ based on the weight of the sodium borohydride ($NaBH_4$).

In some embodiments, the method of present disclosure may be adapted to other borohydride salts, including, but not limited to, potassium borohydride, calcium borohydride, magnesium borohydride, aluminum borohydride, zinc borohydride, barium borohydride, cesium borohydride, rubidium borohydride, strontium borohydride, tetrabutylammonium borohydride, ammonium borohydride, trimethylammonium borohydride, benzyltrimethylammonium borohydride, potassium tetraphenylborate, lithium tetrafluoroborate, potassium tetrafluoroborate, sodium tetrafluoroborate, copper borohydride, nickel borohydride, iron borohydride, lead borohydride, copper (II) borohydride, thallium borohydride, gold borohydride, silver borohydride, rhodium borohydride, palladium borohydride, antimony borohydride, and/or combinations thereof may also be used.

EXAMPLES

The following examples demonstrate the synthesis and properties of a $CaHPO_4/Ca_6Si_6O_{17}(OH)_2/SiO_2/g\text{-}C_3N_4$ nanocomposite as described herein. The examples are provided solely for illustration and are not to be construed as limitations of the present disclosure, as many variations thereof are possible without departing from the spirit and scope of the present disclosure.

Example 1: Fabricating the $CaSiO_3$

Equimolar amounts of calcium nitrate and sodium metasilicate were dispersed in 100 mL of ethanol:water (1:1) in a 150 mL glass beaker and sonicated for 15 minutes. The mixture was transferred to a 200 mL autoclave and then placed in an oven operated at 180° C. for 2 hours. The product was dispersed in 500 mL distilled water with an ultrasonic bath for 10 minutes, filtered via a Buchner system, rinsed with distilled water, and dried at 120° C. for 1 hour.

Example 2: Fabricating the $g\text{-}C_3N_4$

About 30.0 g of urea was placed in a 100 mL porcelain crucible and closed by its porcelain cover. The hall crucible and cover were wrapped with three layers of aluminum foil to reduce the urea loss of evaporation. The crucible was heated via a furnace set at 600° C. for 45 minutes.

Example 3: Fabricating the $g\text{-}C_3N_4$

An equal amount of $CaSiO_3$, $g\text{-}C_3N_4$, and $P_2O_5$ were transferred to a mono wave-200 vial (G30) and dispersed in 20 mL ethylene glycol monomethyl ether via an ultrasonic bath for 30 minutes. The vial was closed with its teflon cover and placed in an Anton-Baar Monowave-200 operated at 180° C. and 5.0 bar pressure for one hour. The product was dispersed in 1L distilled water using an ultrasonic bath for 30 minutes; the product was filtered via a Buchner system, rinsed with distilled water, and dried at 150° C. for 2 hours.

Example 4: Characterizations

Figure 2:
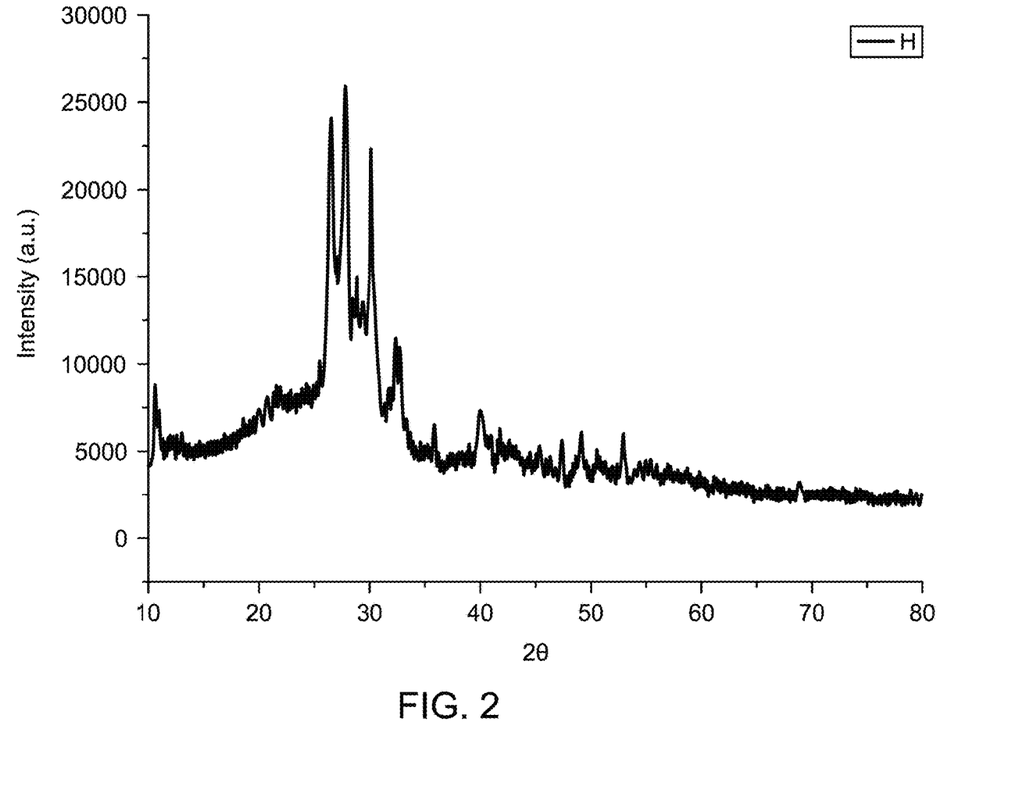
FIG. 2 depicts an X-ray diffraction (XRD) diffractogram of the $CaHPO_4$/$Ca_6Si_6O_{17}(OH)_2$/g-$C_3N_4$ nanocomposite, according to certain embodiments.

The crystallinity and identification of the phases present in the $CaHPO_4/CaSiO_3/g\text{-}C_3N_4$ catalyst were analyzed by X-ray diffraction (XRD) and the results are given in FIG. 2. The broadening of peaks indicate that the powder exhibits particles of small size. Examination of the diffraction patterns with the standard JCPDS cards reveals the presence of $CaHPO_4$ as major phase together with $Ca_6Si_6O_{17}(OH)_2$, and $g\text{-}C_3N_4$ as minor phases. According to the JCPDS Card No. 00-003-0423, the disclosure of which is incorporated herein by reference in its entirety, the $CaHPO_4$ phase was indexed to the 2⊖ values of 26.7°, 30.3°, 32.5°, 32.9°, 35.9°, 40.4°, 49.1°, and 53.7°. The hydroxylated phase of $CaSiO_3$ (JCPDS Card No. 00-015-0313, the disclosure of which is incorporated herein by reference in its entirety) was detected at 2⊖ values of 27.9°, 30.1°, 32.4°, and 40.0°. The diffractions related to $g\text{-}C_3N_4$ was observed at 32.5°, 39.7° (COD No. 1534042 and JCPDS Card No. 00-050-0664, the disclosures of which are incorporated herein by reference in their entirety). Minor traces of $SiO_2$ were detected at 2θ value of 10.7° and 21.1° (JCPDS Card No. 00-043-0745, the disclosure of which is incorporated herein by reference in its entirety). No other phases were detected indicating the successful fabrication of $CaHPO_4/Ca_6Si_6O_{17}(OH)_2/g\text{-}C_3N_4$.

Figure 3A:
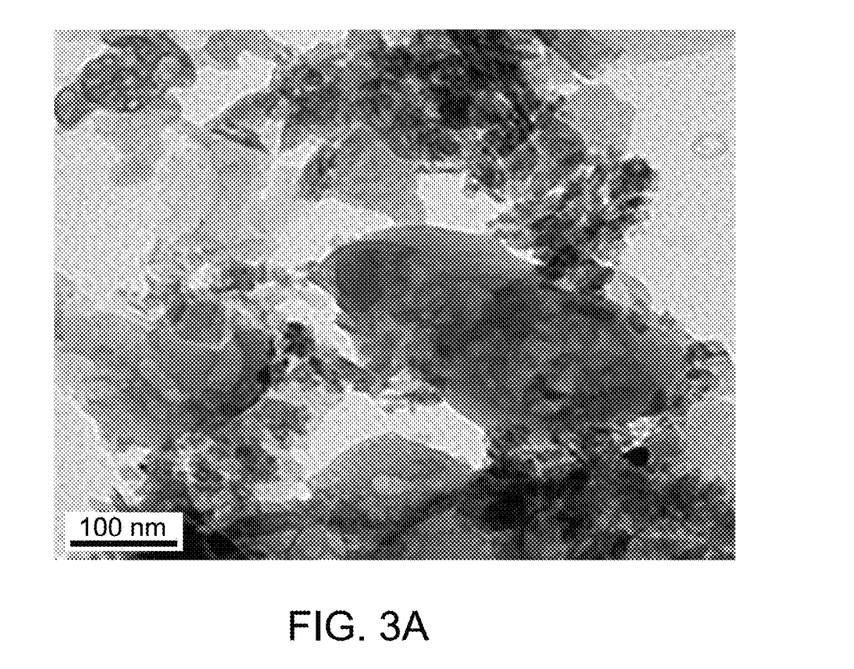
FIG. 3A depicts a transmission electron microscope (TEM) image of the $CaHPO_4$/$Ca_6Si_6O_{17}(OH)_2$/g-$C_3N_4$ nanocomposite at 5 nanometers (nm) resolution, according to certain embodiments.

TEM images of the $CaHPO_4/Ca_6Si_6O_{17}(OH)_2/g\text{-}C_3N_4$ nanocomposite are presented in FIG. 3A. The TEM images show a two-dimensional porous structure constructed with curled and wrinkled nanosheets and platelets of the $g\text{-}C_3N_4$. The image also shows a dispersion of rod like particles—a fraction of said rod-like particles having a length of from 25 to 75 nm—and homogeneous substantially spherical metal oxides nanoparticles disposed on nanosheets of $g\text{-}C_3N_4$. A fraction of the homogenous substantially spherical metal oxide nanoparticles have a particle size of from 5 to 20 nm.

Figure 3B:
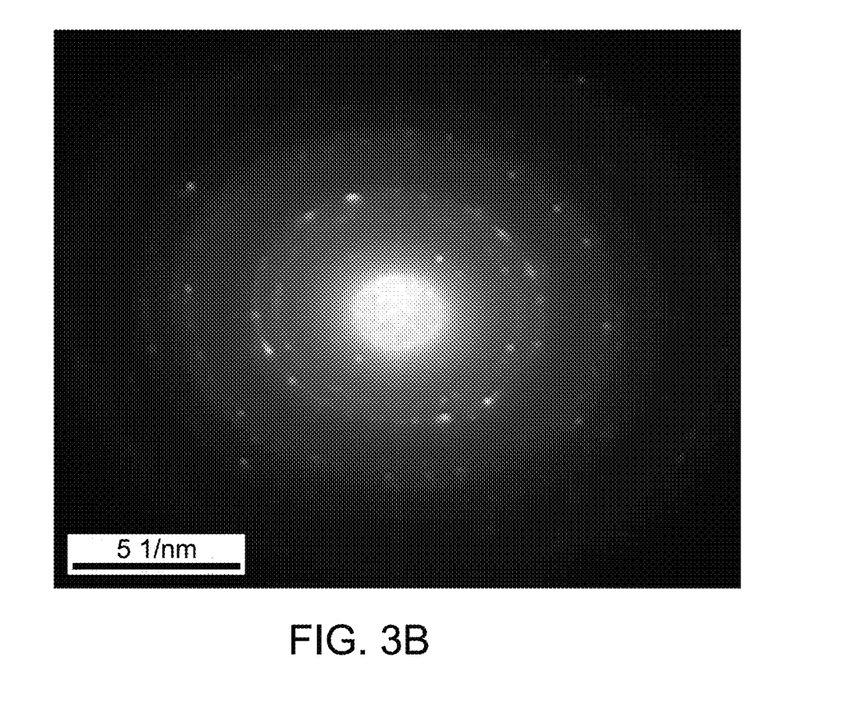
FIG. 3B depicts a selected area electron diffraction (SAED) pattern image of the $CaHPO_4$/$Ca_6Si_6O_{17}(OH)_2$/g-$C_3N_4$ nanocomposite, according to certain embodiments.
Figure 3C:
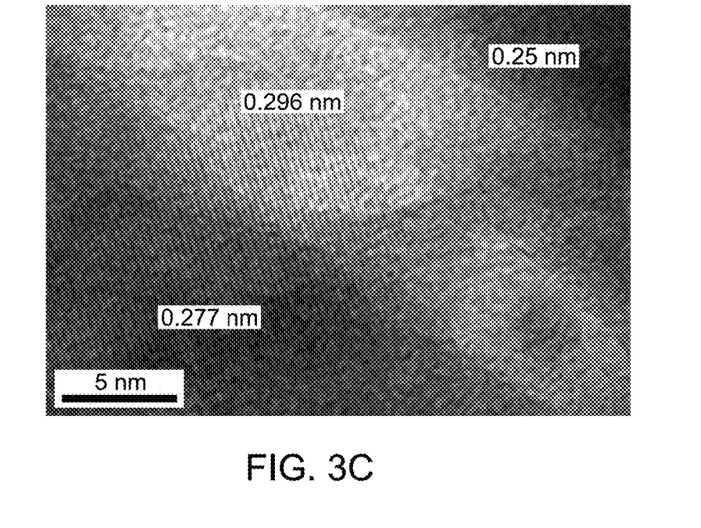
FIG. 3C depicts a high-resolution transmission electron microscopy (HRTEM) image of the $CaHPO_4$/$Ca_6Si_6O_{17}(OH)_2$/g-$C_3N_4$ nanocomposite at 100 nm resolution, according to certain embodiments.
Figure 3D:
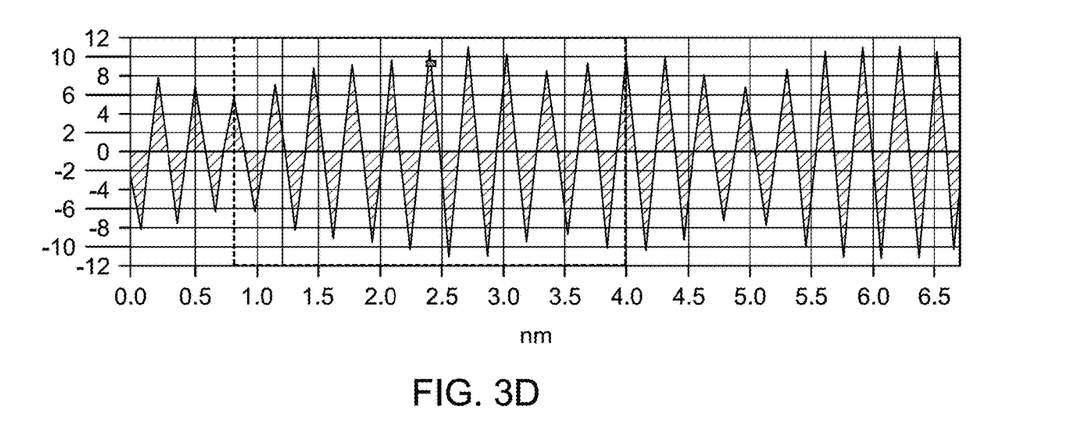
FIG. 3D depicts a fast Fourier transform (FFT) graph of the $CaHPO_4$/$Ca_6Si_6O_{17}(OH)_2$/g-$C_3N_4$ nanocomposite, according to certain embodiments.
Figure 3E:
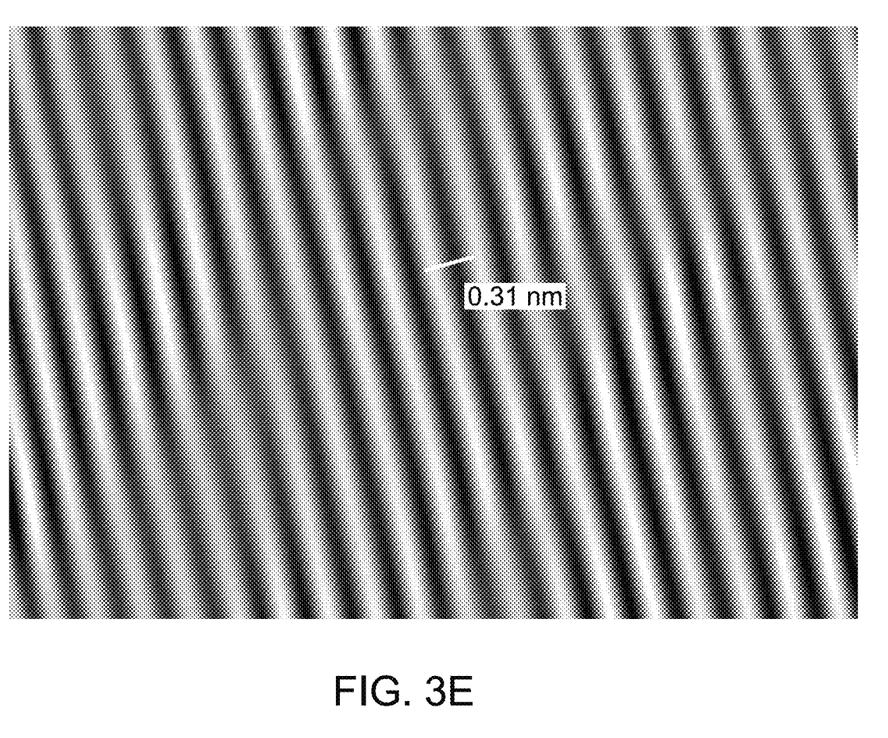
FIG. 3E depicts an inverse fast Fourier transform (IFFT) graph of the $CaHPO_4$/$Ca_6Si_6O_{17}(OH)_2$/g-$C_3N_4$ nanocomposite, according to certain embodiments.

The corresponding selected area electron diffraction (SAED) pattern, as shown in FIG. 3B, reveals diffraction spots with interplanar spacing of 0.461 nm, 0.297 nm, 0.246 nm, 0.171 nm, 0.158 nm, and 0.139 nm due to ($CaSiO_3$: 111, $CaHPO_4$: 1-10), ($CaSiO_3$: 320, $CaHPO_4$: 210), ($CaSiO_3$: 122, $CaHPO_4$: −1-12), ($CaSiO_3$: 72-2, $CaHPO_4$: −133), ($CaSiO_3$: 242, $CaHPO_4$: −124, $g\text{-}C_3N_4$; 301), and ($CaSiO_3$: 243, $g\text{-}C_3N_4$; 321) diffraction planes. The corresponding HRTEM of the composite shows a planar spacing of 0.296 nm, 0.277 nm, and 0.25 nm related to the ($CaSiO_3$: 320, $CaHPO_4$: 210), ($CaSiO_3$: 32-1, $CaHPO_4$: 2-13), ($CaSiO_3$: 122, $CaHPO_4$: −1-21) planes are characterizing the heterostructure formation, as shown in FIG. 3C. The Fast Fourier Transform (FFT) and inverse Fast Fourier Transform (IFFT) measurements show a d value of 0.31 nm given to $CaHPO_4/Ca_6Si_6O_{17}(OH)_2/g\text{-}C_3N_4$ nanocomposite, signifying the lattice spacing of ($C_3N_4$: 110, $CaSiO_3$: 202), indicating the development of $g\text{-}C_3N_4$ structure, as shown in FIGS. 3D-3E.

Figure 4A:
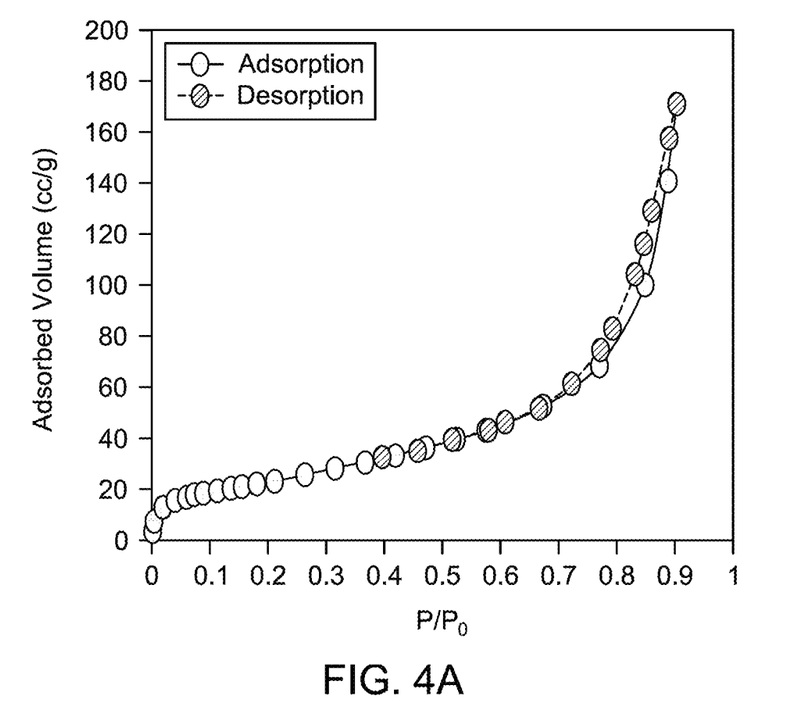
FIG. 4A depicts an adsorption-desorption isotherms of the $CaHPO_4$/$Ca_6Si_6O_{17}(OH)_2$/g-$C_3N_4$ nanocomposite according to certain embodiments.
Figure 4B:
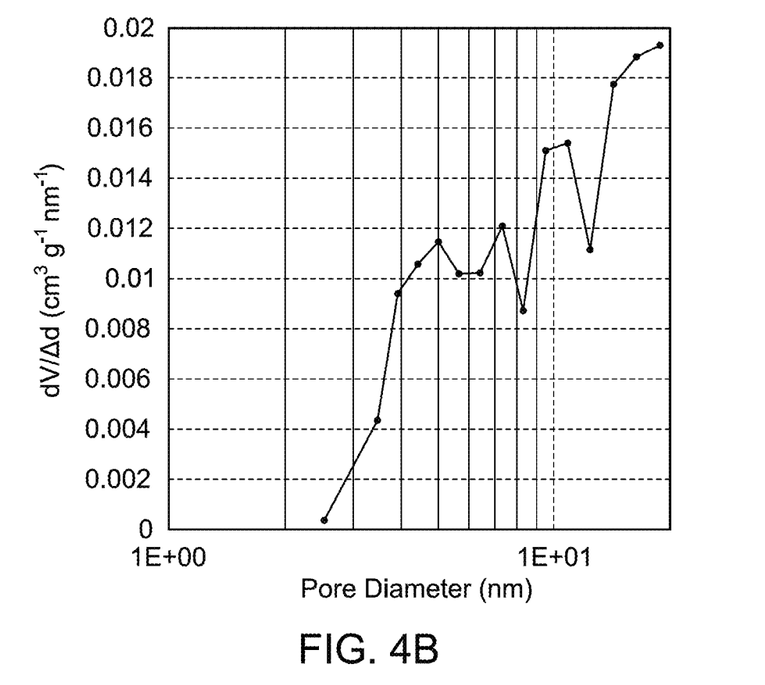
FIG. 4B depicts a pore size distribution curve of the $CaHPO_4$/$Ca_6Si_6O_{17}(OH)_2$/g-$C_3N_4$ nanocomposite, according to certain embodiments.

FIG. 4A displays the nitrogen adsorption-desorption isotherms of the exemplified $CaHPO_4/Ca_6Si_6O_{17}(OH)_2/g\text{-}C_3N_4$ nanocomposite. The nitrogen sorption isotherm of the composite presents a narrow hysteresis loop which is attributed to the formation of mesoporous structures. However, shifting the loop to a relatively higher pressure ($P/P_0$=0.72-1) suggests the presence of wide mesopores, which may result from the deposition of metal oxides particles in the wide pores of $g\text{-}C_3N_4$. Furthermore, the BET surface area of the $CaHPO_4/Ca_6Si_6O_{17}(OH)_2/g\text{-}C_3N_4$ sample was calculated to be 90.0 square meter per gram ($m^2 \, g^{-1}$). The marked high specific surface area reflects the good dispersion of the metal oxides nanoparticles on $g\text{-}C_3N_4$ and $CaSiO_3$. Moreover, the pore size distribution curves, plotted using the Barrett-Joyner-Halenda (BJH) method, for the $CaHPO_4/Ca_6Si_6O_{17}(OH)_2/g\text{-}C_3N_4$ sample exhibited average pore diameters maximized at 18.92 nm and pore volume of 0.265 cubic centimeter per gram ($cm^3 \, g^{-1}$), as shown in FIG. 4B. All the isotherms belong to the category $H_3$ type of pores, which do not exhibit limiting adsorption at high $P/P°$ and arise due to aggregation of plate-like particles giving rise to slit-shaped pores. This indicates that the assembly of $CaHPO_4/Ca_6Si_6O_{17}(OH)_2/g\text{-}C_3N_4$ composite provoked a mesoporous array.

Example 5: Generating $H_2$ from the Hydrolysis of $NaBH_4$

Figure 5:
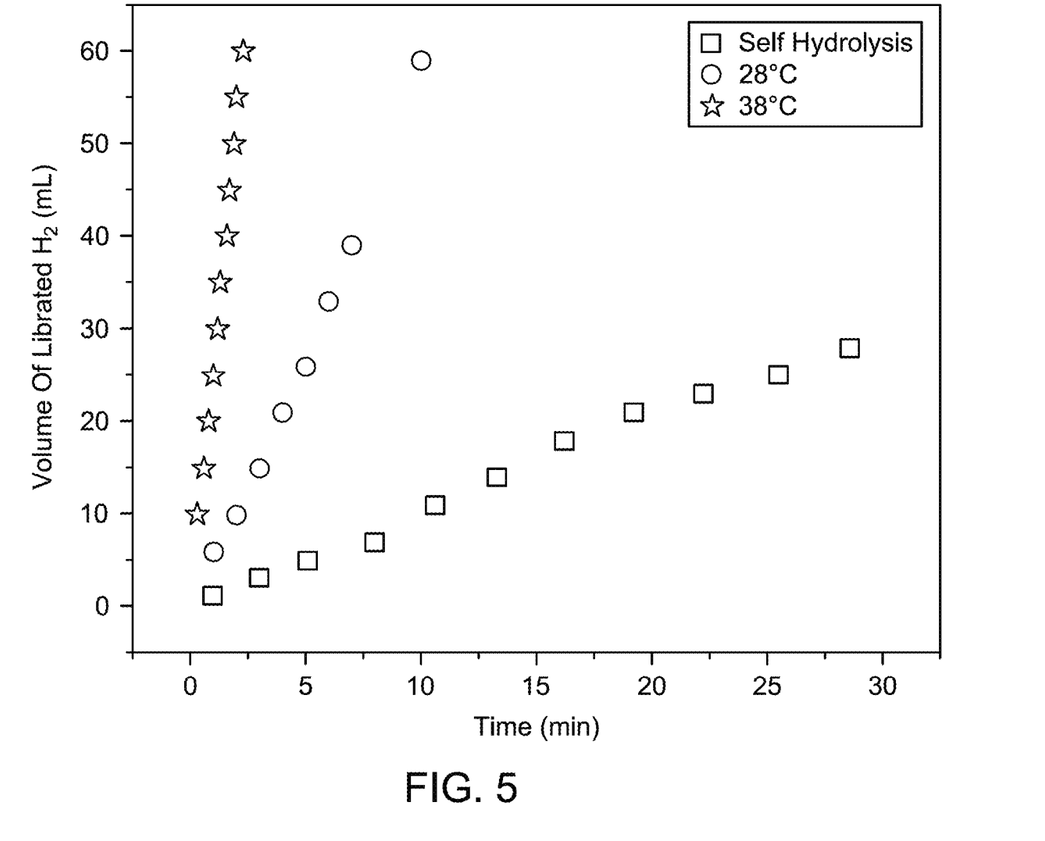
FIG. 5 depicts a variation of volume of liberated $H_2$ with reaction time over the $CaHPO_4$/$Ca_6Si_6O_{17}(OH)_2$/g-$C_3N_4$ nanocomposite, according to certain embodiments.

The results of hydrolysis of $NaBH_4$ with and without 0.5 g of $CaHPO_4$ @ $CaSiO_3$ @ $g\text{-}C_3N_4$ nanocomposite catalyst is shown in FIG. 5. The catalytic action of the $CaHPO_4$@$CaSiO_3$ @ $g\text{-}C_3N_4$ nanocomposite was clearly observed where the catalytic reaction exhibited catalytic activity higher than the self-hydrolysis process. According to the data analysis, hydrogen gas volume rises gradually over time. In addition, the catalytic hydrolysis reaction increases with increasing the reaction temperature. Results demonstrate that, on using 0.7 g of NaBH$_4$—relative to 0.5 g of CaHPO$_4$@ CaSiO$_3$ @g-C$_3$N$_4$ nanocomposite catalyst—values of HGR of 245 milliliter per minute per gram (mL min$^{-1}$ g$^{-1}$)—and 1080-mL min$^{-1}$ g$^{-1}$ were obtained at reaction temperatures of 28° C., and 38° C., respectively.

In the present disclosure, CaHPO$_4$/CaSiO$_3$ @ g-C$_3$N$_4$ nanocomposite was successfully fabricated by a facile and low-cost method. The synthesized catalyst was characterized by XRD, TEM and BET. XRD confirmed the successful fabrication of CaHPO$_4$/CaSiO$_3$ @ g-C$_3$N$_4$ nanocomposite. The disclosure focused on the fabrication of the CaHPO$_4$/CaSiO$_3$ @ g-C$_3$N$_4$ nanocomposite and the generation of H$_2$ as a fuel with the highest hydrogen generation rate (HGR).

Numerous modifications and variations of the present disclosure are possible in light of the above teachings. It is therefore to be understood that within the scope of the appended claims, the invention may be practiced otherwise than as specifically described herein.

The invention claimed is:

1. A method of producing hydrogen gas, comprising:
   hydrolyzing sodium borohydride (NaBH$_4$) with water at a temperature of from about 20 to about 75° C. in the presence of a particulate crystalline nanocomposite catalyst,
   wherein the ratio by weight of sodium borohydride to the particulate crystalline nanocomposite catalyst is from about 1:1 to about 5:1,
   wherein the particulate crystalline nanocomposite catalyst comprises:
      a CaHPO$_4$ crystalline phase;
      a Ca$_6$Si$_6$O$_{17}$(OH)$_2$ crystalline phase;
      a SiO$_2$ crystalline phase; and,
      a graphitic-C$_3$N$_4$ crystalline phase,
   wherein at least a fraction of the graphitic-C$_3$N$_4$ is in the form of mesoporous nanosheets.

2. The method according to claim 1, wherein based on the weight of the particulate crystalline nanocomposite:
   CaHPO$_4$ is present in an total amount of from about 20 to about 40 wt. %;
   Ca$_6$Si$_6$O$_{17}$(OH)$_2$ is present in an amount of about 20 to about 30 wt. %;
   SiO$_2$ is present in an amount of from about 1 to about 10 wt. %; and,
   C$_3$N$_4$ is present in an amount of about 20 to about 30 wt. %.

3. The method according to claim 1, wherein the particulate crystalline nanocomposite comprises acicular particles of Ca$_6$Si$_6$O$_{17}$(OH)$_2$ having a median length of from about 20 to about 80 nm, as determined by Transmission Electron Microscopy.

4. The method according to claim 1, wherein the particulate crystalline nanocomposite comprises aggregates of the mesoporous nanosheets of graphitic-C$_3$N$_4$ with substantially spherical particles of SiO$_2$ and CaHPO$_4$.

5. The method according to claim 1, wherein the particulate crystalline nanocomposite comprises aggregates of:
   the mesoporous nanosheets of graphitic-C$_3$N$_4$; and,
   substantially spherical particles of SiO$_2$ and CaHPO$_4$ having a median particle size of from about 5 to about 30 nm, as determined by Transmission Electron Microscopy.

6. The method according to claim 1, wherein at least about 50 wt. % of the graphitic-C$_3$N$_4$ is in the form of mesoporous nanosheets.

7. The method according to claim 1, wherein at least about 80 wt. % of the graphitic-C$_3$N$_4$ is in the form of mesoporous nanosheets.

8. The method according to claim 1, wherein the particulate crystalline nanocomposite has an average pore diameter of from about 10 to about 25 nm, as determined by Barrett-Joyner-Halenda (BJH) desorption analysis.

9. The method according to claim 1, wherein the particulate crystalline nanocomposite has an average pore diameter of from about 15 to about 25 nm, as determined by Barrett-Joyner-Halenda (BJH) desorption analysis.

10. The method according to claim 1, wherein the particulate crystalline nanocomposite has a pore volume of from about 0.1 to about 0.4 cm$^3$/g, as determined by Barrett-Joyner-Halenda (BJH) desorption analysis.

11. The method according to claim 1, wherein the particulate crystalline nanocomposite has a pore volume of from about 0.2 to about 0.3 cm$^3$/g, as determined by Barrett-Joyner-Halenda (BJH) desorption analysis.

12. The method according to claim 1, wherein the particulate crystalline nanocomposite has a hysteresis loop of Type H3 (IUPAC Classification), as determined by N$_2$ adsorption-desorption analysis at 77K.

13. The method according to claim 1 further comprising preparing the particulate crystalline nanocomposite by:
   forming a solution of a calcium salt and an alkali metal silicate in a solvent comprising water and a C$_1$-C$_4$ alkanol;
   heating the solution at a temperature of from about 150 to about 250° C. to form a dry product of CaSiO$_3$;
   forming graphitic-C$_3$N$_4$ by heating urea in a closed vessel at a temperature of from about 500 to about 700° C.;
   dispersing the CaSiO$_3$, graphitic-C$_3$N$_4$ and P$_2$O$_5$ in a polar protic solvent and heating the dispersion at a temperature of from about 150 to about 250° C. at a pressure of from about 2 to about 8 Bar; and,
   separating the solid crystalline nanocomposite from the heated dispersion.

14. The method according to claim 1, wherein the ratio by weight of sodium borohydride to the particulate crystalline nanocomposite catalyst is from about 1:1 to about 3:1.

15. The method according to claim 1, wherein sodium borohydride is hydrolyzed with water at a temperature of from about 25 to about 70° C.

16. The method according to claim 1, wherein sodium borohydride is hydrolyzed with water at a temperature of from about 35 to about 60° C.

17. The method according to claim 1 having a hydrogen generation rate of from about 100 to about 1500 mL min$^{-1}$ g$^{-1}$ based on the weight of the sodium borohydride (NaBH$_4$).

18. The method according to claim 1 having a hydrogen generation rate of from about 200 to about 1500 mL min$^{-1}$ g$^{-1}$ based on the weight of the sodium borohydride (NaBH$_4$).

* * * * *